(12) United States Patent
Wong et al.

(10) Patent No.: US 8,656,117 B1
(45) Date of Patent: *Feb. 18, 2014

(54) READ COMPLETION DATA MANAGEMENT

(75) Inventors: Raymond Hoi Man Wong, Santa Clara, CA (US); Samuel Hammond Duncan, Arlington, MA (US); Lukito Muliadi, San Jose, CA (US); Madhukiran V. Swarna, Portland, OR (US)

(73) Assignee: Nvidia Corporation, Santa Clara, CA (US)

( * ) Notice: Subject to any disclaimer, the term of this patent is extended or adjusted under 35 U.S.C. 154(b) by 901 days.

This patent is subject to a terminal disclaimer.

(21) Appl. No.: 12/262,141

(22) Filed: Oct. 30, 2008

(51) Int. Cl.
*G06F 12/00* (2006.01)

(52) U.S. Cl.
USPC ................ 711/154; 711/167; 710/56; 710/58

(58) Field of Classification Search
USPC ............................ 711/154, 167; 710/56, 58
See application file for complete search history.

(56) References Cited

U.S. PATENT DOCUMENTS

| | | | | |
|---|---|---|---|---|
| 5,854,911 | A * | 12/1998 | Watkins | 712/207 |
| 6,449,678 | B1 * | 9/2002 | Batchelor et al. | 710/310 |
| 6,510,470 | B1 * | 1/2003 | Capelli | 719/323 |
| 7,660,933 | B2 * | 2/2010 | Wang | 710/310 |
| 7,791,611 | B1 * | 9/2010 | Holmqvist et al. | 345/545 |
| 2009/0172257 | A1 * | 7/2009 | Prins et al. | 711/103 |

* cited by examiner

*Primary Examiner* — Kalpit Parikh
(74) *Attorney, Agent, or Firm* — Patterson + Sheridan, L.L.P.

(57) ABSTRACT

An input/output unit for a computer system that is interfaced with a memory unit having a plurality of partitions manages completions of read requests in the order that they were made. A read request buffer tracks the order in which the read requests were made so that read data responsive to the read requests can be completed and returned to a requesting client in the order the read requests were made.

19 Claims, 7 Drawing Sheets

READ COMPLETION DATA MANAGEMENT

BACKGROUND OF THE INVENTION

1. Field of the Invention

The present invention generally relates to computer hardware. More specifically, the present invention relates to read completion data management in a processing unit.

2. Description of the Related Art

A modern computer system may be implemented with a processor that executes many operations in parallel known as a parallel processing unit (PPU). PPUs are generally managed by one or more engines or clients, that perform operations such as memory management, graphics display, instruction fetching, encryption, and other operations.

As clients carry out operations, they make requests to read data from parallel processor (PP) memory, which is typically implemented as multiple memory units. As a result, when a read request is made, the requested data may be stored across different memory units in the form of data fragments. These data fragments may not be returned in the proper order, however, and reassembly may be required before the data can be returned to the client. Complications arise when multiple clients request data at the same time because fragments from different clients may be returned interleaved.

Further complications arise when multiple clients make multiple requests for data. Each request may require data reassembly as before, and the requests may be completed in a different order than the requests were made. Some clients, known as in-order clients, require data to be returned in the order the request were made.

SUMMARY OF THE INVENTION

Embodiments of the invention provide a method and a system for managing completions of read requests in the order that they were made. In the embodiments of the invention, the order in which read requests are made by in-order clients (i.e., clients that require read requests to be completed in the order they were issued) is tracked so that the read requests can be completed in the order they were made.

A method for managing read completions, according to an embodiment of the invention, includes the steps of tracking an order of multiple read requests in a read request buffer, storing data fragments associated with the read requests in multiple read return buffers, storing addresses of locations within the multiple read return buffers in which the data fragments are stored, and reading out data fragments associated with the read requests from the multiple read return buffers using the stored addresses and based on the tracked order of the read requests.

A method for managing read completions, according to another embodiment of the invention, includes the steps of receiving multiple read requests from multiple clients, including at least one in-order client, tracking an order of read requests that are received from each in-order client, storing data fragments associated with the read requests in an addressable memory, and, for read requests from an in-order client, reading out data fragments associated with the read requests from the addressable memory in accordance with the tracked order.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
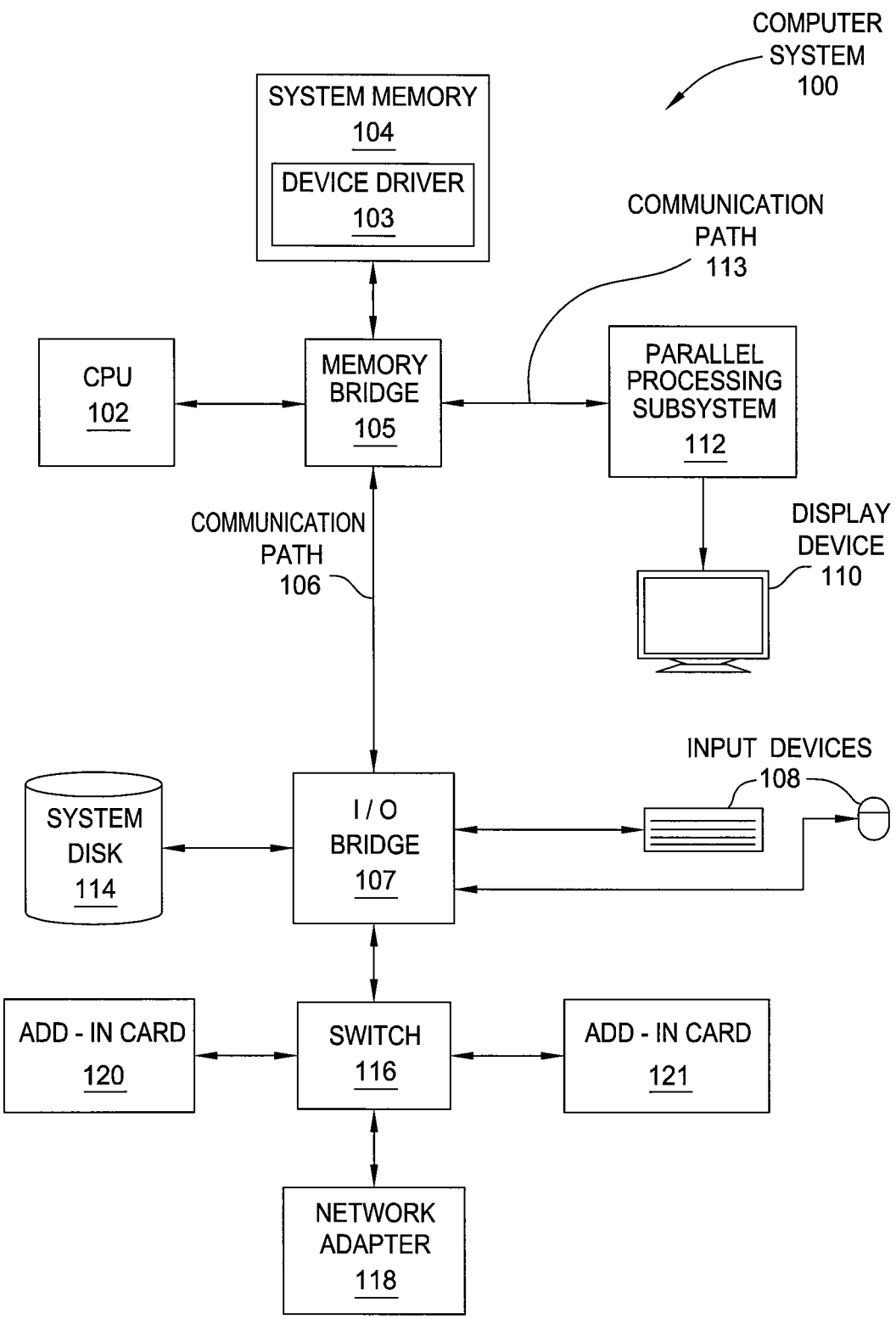
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
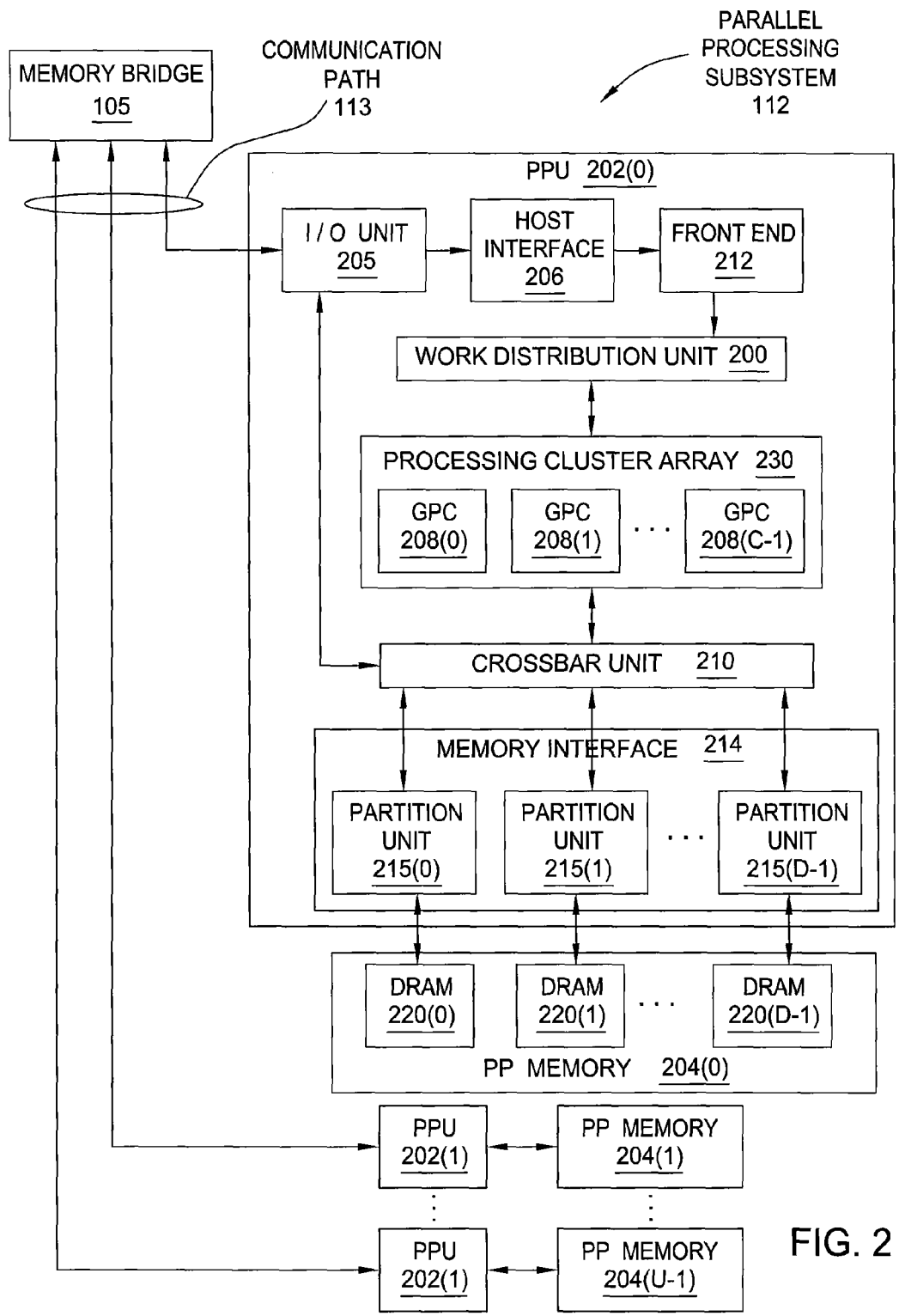
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Figure 3:
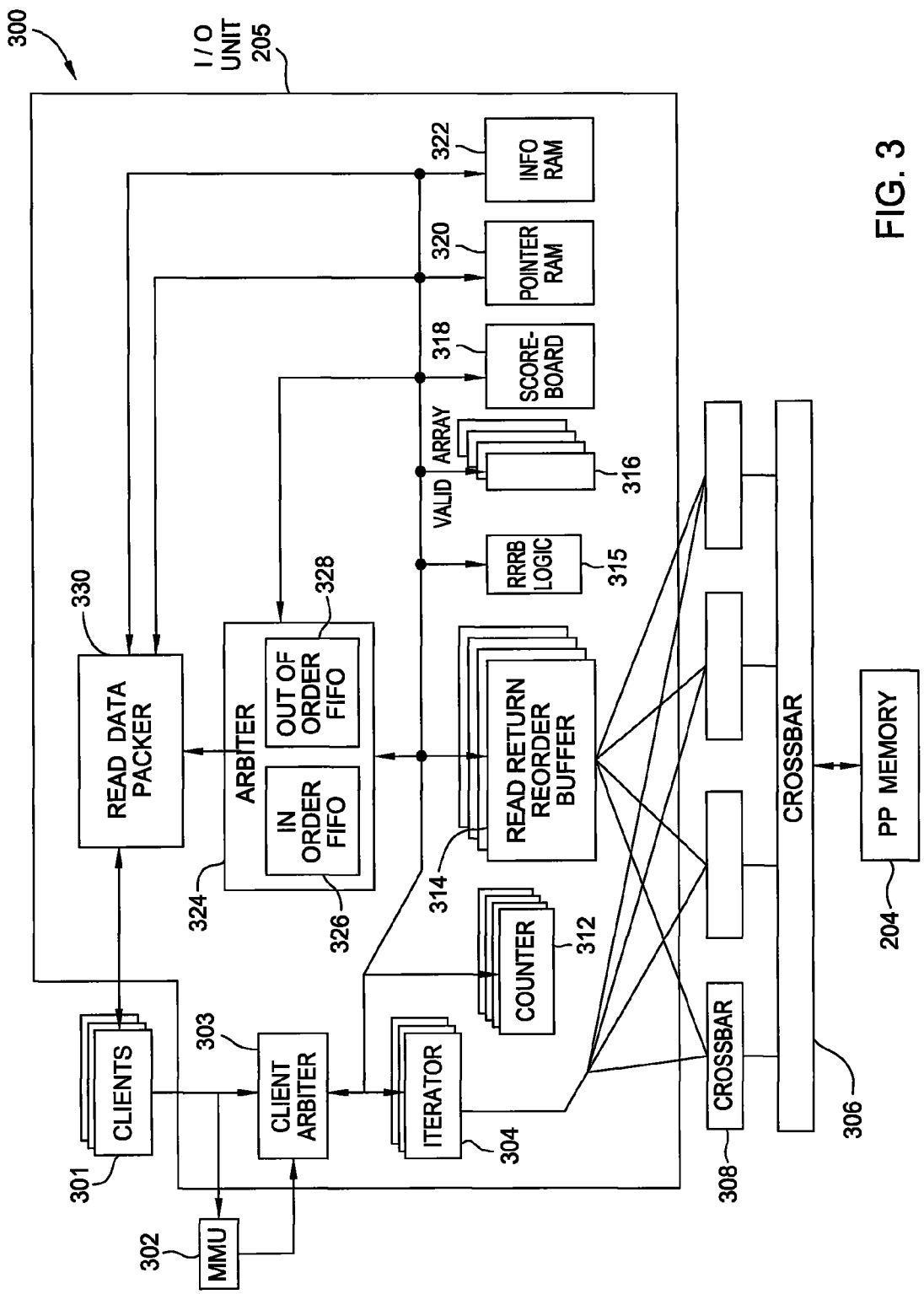
FIG. 3 is a block diagram of components of the PPU of FIG. 2 that handle read requests from clients, according to one embodiment of the present invention.

FIG. 3 is a block diagram of components of a PPU 202 that handle read requests from clients, according to one embodiment of the invention. As shown, FIG. 3 includes one or more clients 301 that issue read requests to PP memory 204. Clients 301 include host interface 206, front end 212, and engines that perform operations such as memory management, graphics display, instruction fetching, encryption, and other operations. Read requests issued by clients 301 include a virtual address and size of the data. The virtual address in each of these requests is transmitted by clients 301 to a memory management unit (MMU) 302 that translates the virtual address into a physical address and transmits the physical address to a client arbiter 303.

When client arbiter 303 grants a read request, a scoreboard 318 provides a tracker index corresponding to a free row within scoreboard 318 that may be used to track the read completion status of the read request. The tracker index is transmitted to an iterator 304 along with the physical address associated with the read request. Iterator 304 translates the physical address into a crossbar raw address that indicates a crossbar (x-bar) slice 308 through which data will be requested and returned. Iterator 304 splits each request into "subrequests" and assigns each constituent subrequest a "subID" within which the tracker index corresponding to the main request is embedded. The subrequests are sent to PP memory 204 through x-bar slices 308 and x-bar 306. PP memory 204 returns the requested read data as fragments to the corresponding x-bar slice 308. The subID of the corresponding subrequest is returned as well, allowing the returned data fragments to be identified. Returned data fragments from a particular x-bar slice 308 are stored temporarily in a read return reorder buffer (RRRB) 314 connected to that x-bar slice 308.

Associated with each RRRB 314 is a counter 312 and a valid array 316. Counter 312 keeps track of the amount of available space in RRRB 314. Counter 312 is incremented when a request is granted, and decremented when the returned data fragments are read from RRRB 314. Client arbiter 303 checks the value of counter 312 before granting the request. When counter 312 is at its maximum value, client arbiter 303 stalls the client until counter 312 is decremented, indicating that space in RRRB 314 has become available.

Valid array 316 indicates which rows of RRRB 314 are available to store data fragments (e.g., 0=row is available; 1=row is not available). Data fragments returned from x-bar slice 308 are stored in any row of RRRB 314 indicated as available by valid array 316. RRRB logic 315 updates the corresponding row of valid array 316 to reflect that the row in RRRB 314 is no longer available to store data. When data is read from a row of RRRB 314, the RRRB logic 315 updates the corresponding row of valid array 316 to reflect that the row of RRRB 314 is available.

A pointer RAM 320 records addresses corresponding to the locations of data fragments stored in RRRB 314. When a request is granted, scoreboard 318 reserves a row in pointer RAM 320 corresponding to the tracker index of that request. When data fragments are returned through x-bar slices 308 and stored in RRRB 314, the addresses of the locations within RRRB 314 in which the returned data fragments are stored are recorded in the row of pointer RAM 320 associated with that request. For example, if a request is split into subrequest A and subrequest B, the address of storage location corresponding to subrequest A is recorded in the first half of the row and the address of storage location corresponding to subrequest B is recorded in the second half of the row. When the request is granted, scoreboard 318 also reserves a row in info RAM 322 corresponding to the tracker index of that request. Client arbiter 303 may then record information associated with the request, including size, offset and kind of data. In one embodiment, the same row of scoreboard 318, pointer RAM 320, and info RAM 322 is reserved to handle a particular request, and the address of that row is used to generate the tracker index for the request.

RRRB 314 is connected to an arbiter 324 that includes an in-order FIFO 326 and an out-of-order FIFO 328. In-order FIFO 326 receives and stores the tracker index assigned to requests made by in-order clients (i.e., clients 301 that require requests to be completed in the order they were made). The order of requests issued by in-order clients is thus recorded in in-order FIFO 326. Out-of-order FIFO 328 receives and stores the tracker index assigned to a request that is not from an in-order client (hereinafter referred to as an out-of-order client).

A scoreboard 318 indicates when all data associated with a request has been returned and stored in RRRB 314. As data fragments are returned through x-bar slices 308 in response to a request and stored in RRRB 314, RRRB logic 315 updates the row of scoreboard 318 corresponding to that request.

A completion table within scoreboard 318 indicates when all subrequests associated with a request have returned and the request has completed. When a request by an out-of-order client has completed, out-of-order FIFO 328 receives and stores the tracker index associated with that request. Arbiter 324 then allocates a read data packer 330 to read the data fragments associated with that request from RRRB 314 and transmits them to client 301. When a request by an in-order client has completed, arbiter 324 examines in-order FIFO 328 to determine whether the request completed in-order. If older requests are still pending completion, arbiter 324 will not allocate read data packer 330 to read data fragments associated with that request and transmit them to client 301. When read data packer 330 is allocated to handle a request, data fragments associated with that request are read from RRRB 314 using information stored in pointer RAM 320 and info RAM 322, assembled, and then returned to client 301.

Figure 4:
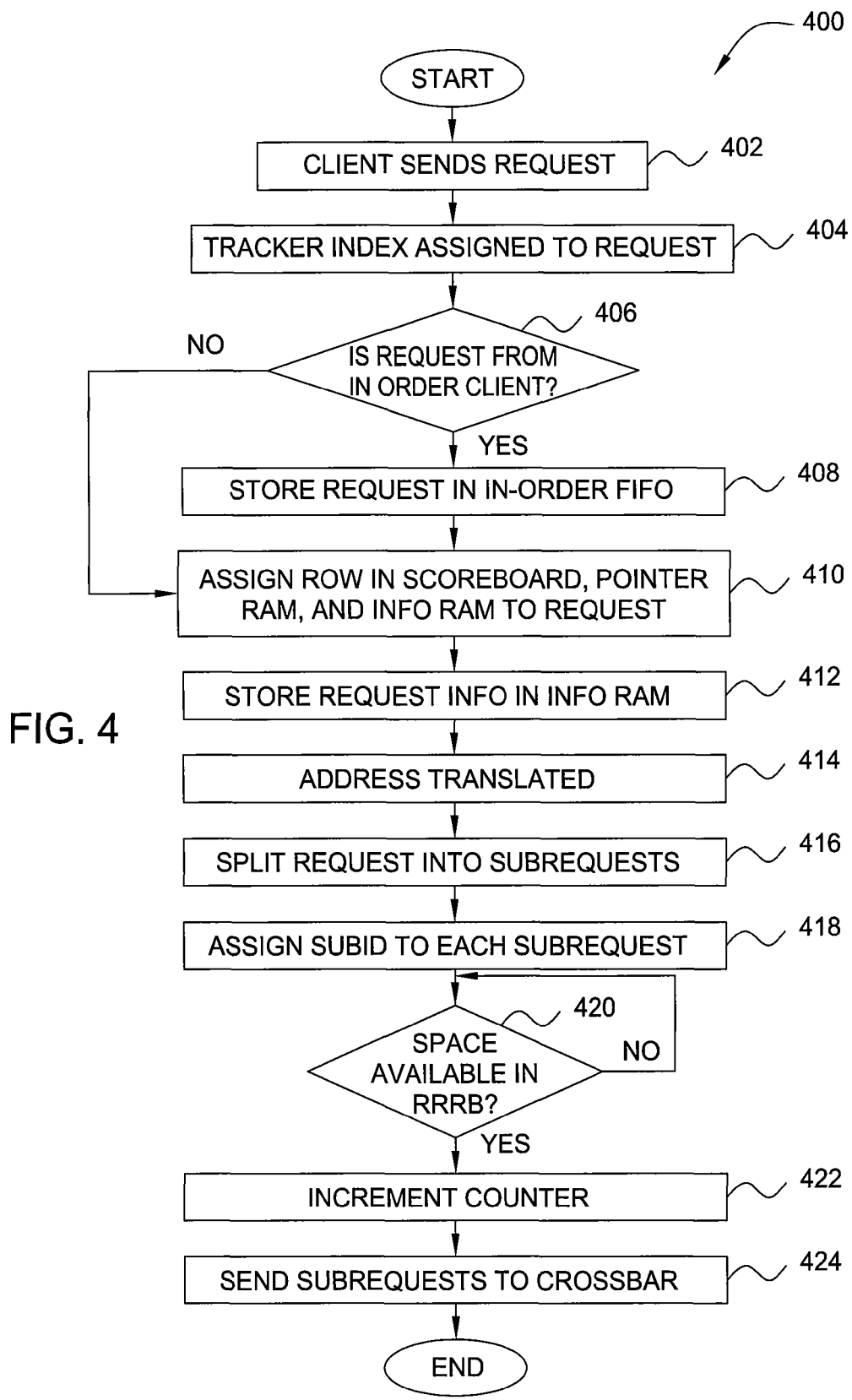
FIG. 4 is a flowchart of method steps for generating subrequests, according to one embodiment of the present invention.

FIG. 4 is a flowchart of method steps for generating subrequests, according to one embodiment of the invention. Persons skilled in the art will understand that, even though method 400 is described in conjunction with the system of FIGS. 1, 2, and 3, any system configured to perform the method steps, in any order, is within the scope of the present invention.

The method 400 begins at step 402, where client 301 issues a read request. At step 404 a tracker index is assigned to the request. At step 406, iterator 304 determines whether the request is from an in-order client. If client 301 is an in-order client, then the method 400 advances to step 408 where the tracker index is stored in in-order FIFO 326, and then the method 400 advances to step 410. If client 301 is an out-of-order client, then the method 400 skips step 408 and advances directly to step 410. At step 410, scoreboard 318 reserves a free row for the request and transmits a tracker index corresponding to that row to client arbiter 303. Rows in pointer RAM 320 and info RAM 322 are also reserved. At step 412, client arbiter 303 stores various information about the request, including the size and offset of the data in info RAM 322.

At step 414, the virtual address of the requested data is translated into a physical address and the physical address is translated into a crossbar raw address that indicates the x-bar slices 308 through which the requested data will be returned. At step 416, iterator 304 splits the request into multiple subrequests according to the different x-bar slices 308 through which the requested data will be returned. At step 418, a subID that includes the tracker index assigned to the request is assigned to each subrequest. At step 420, client arbiter 303 determines whether space exists in RRRB 314 connected to x-bar slices 308 associated with the read request based on counter 312. If sufficient space cannot be found, the request is stalled until space becomes available. If space is available, the method 400 advances to step 422 where counter 312 is incremented, and then to step 424, where iterator 304 sends the subrequests to x-bar slices 308. The method 400 then terminates.

Figure 5:
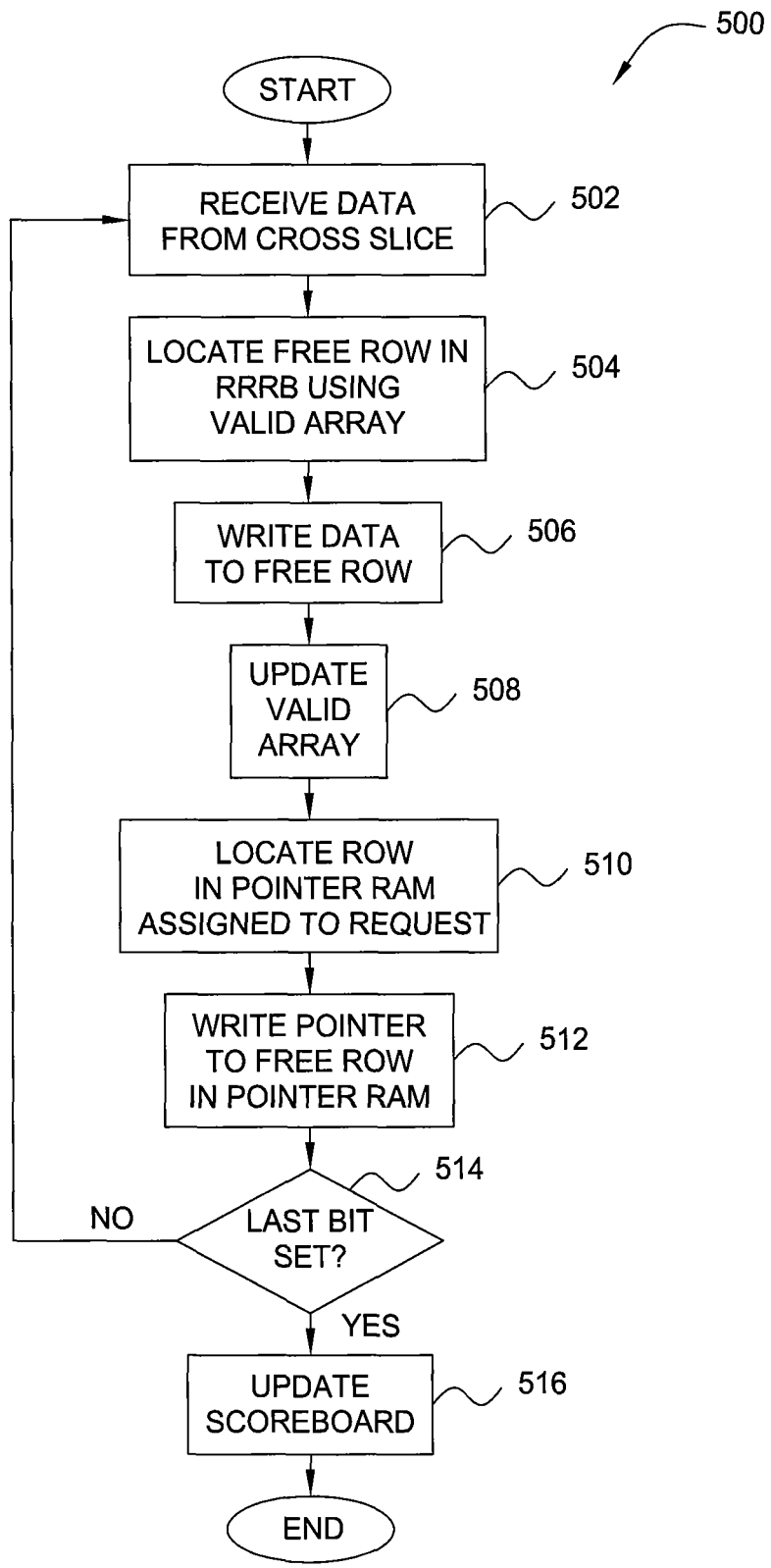
FIG. 5 is a flowchart of method steps for receiving and storing data fragments, according to one embodiment of the present invention.

FIG. 5 is a flowchart of method steps for receiving and storing data fragments, according to one embodiment of the invention. Persons skilled in the art will understand that, even though the method 500 is described in conjunction with the system of FIGS. 1 and 2, any system configured to perform the method steps, in any order, is within the scope of the present invention.

The method 500 starts at step 502 where a data fragment associated with a read request is returned from x-bar slice 308. At step 504, RRRB logic 315 accesses valid array 316 associated with RRRB 314 linked to that x-bar slice 308 and locates a free row in RRRB 314 to store the returned data fragment. At step 506, RRRB logic 315 writes the data fragment to the free row. At step 508, valid array 316 is updated to reflect that new data has been written by flipping the bit associated with that row. At step 510, the row of pointer RAM 320 previously assigned to track the read request is located. At step 512, a pointer to the location in RRRB 314 where the fragment is stored is written to that row in pointer RAM 320. At step 514, the last bit of the returned data is checked to determine whether the complete fragment was read. If the last bit is not set (i.e., indicating that more data will be returned), then the method 500 returns to step 502 and the method 500 repeats. If the last bit is set, the method 500 advances to step 516 where the row in scoreboard 318 associated with the request is located and updated to reflect that one of the constituent data fragments has been returned and stored in RRRB 314. The method 500 then terminates.

Figure 6:
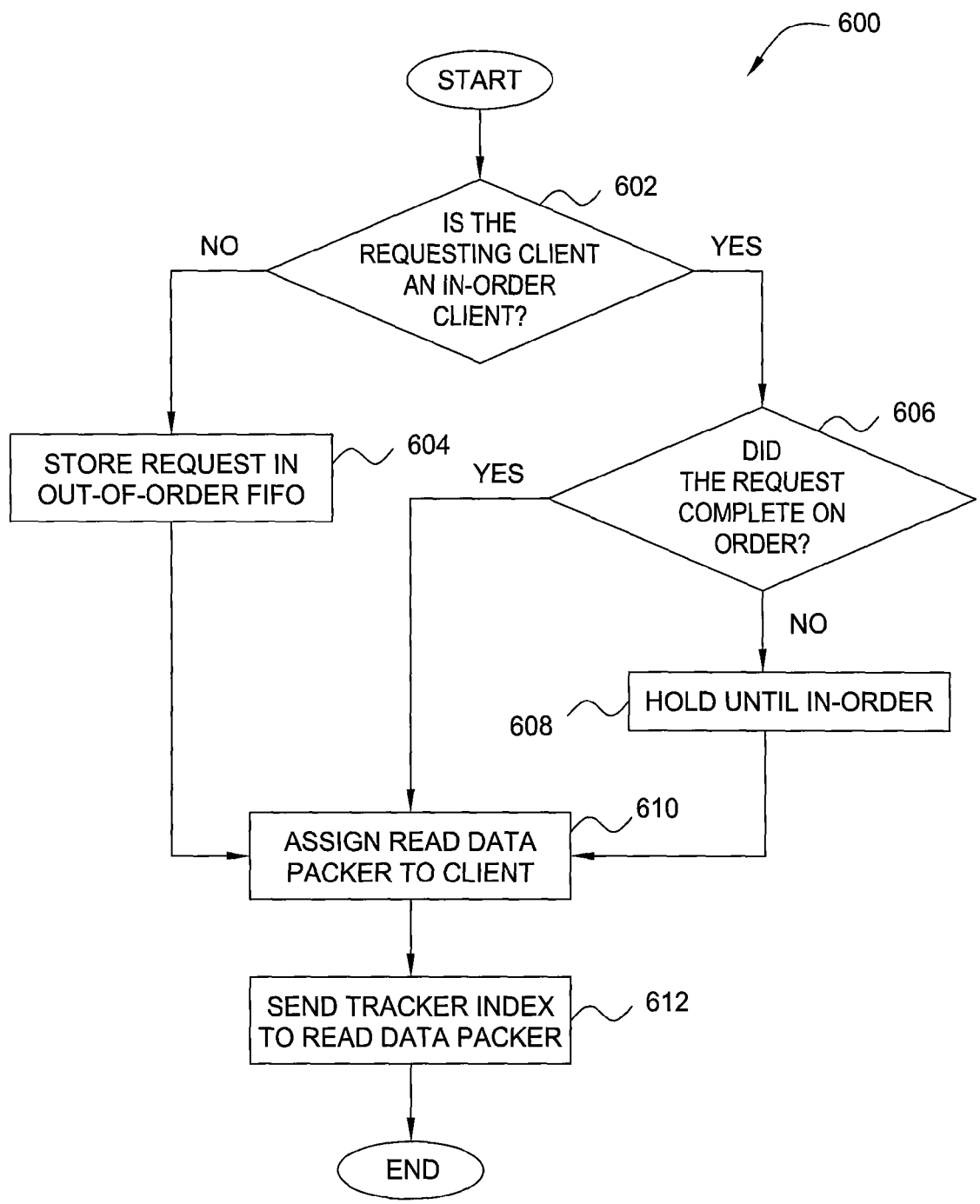
FIG. 6 is a flowchart of method steps for tracking request completion, according to one embodiment of the present invention.

FIG. 6 is a flowchart of method steps for tracking data request completion, according to one embodiment of the invention. Persons skilled in the art will understand that, even though the method 600 is described in conjunction with the system of FIGS. 1 and 2, any system configured to perform the method steps, in any order, is within the scope of the present invention.

The method 600 begins when an entry in scoreboard 318 indicates that all data belonging to a request is available. At step 602, arbiter 324 determines whether client 301 that requested the available data is an in-order client or an out-of-order client. If client 301 is an out-of-order client, the tracker index associated with the request for that data is sent to out-of-order FIFO 328 at step 604, and the method 600 advances to step 610. If client 301 is an in-order client, at step 606 arbiter 324 examines in-order FIFO 326 and determines whether the request was completed in order. If the available data was not completed in the order of the requests, then at step 608 the data is held until all other requests ahead of it have completed. If the available data was completed in the order of the requests, the method 600 advances to step 610. At step 610, arbiter 324 allocates read data packer 330 to client 301 and at step 612 sends the tracker index to read data packer 330. The method 600 then terminates.

Figure 7:
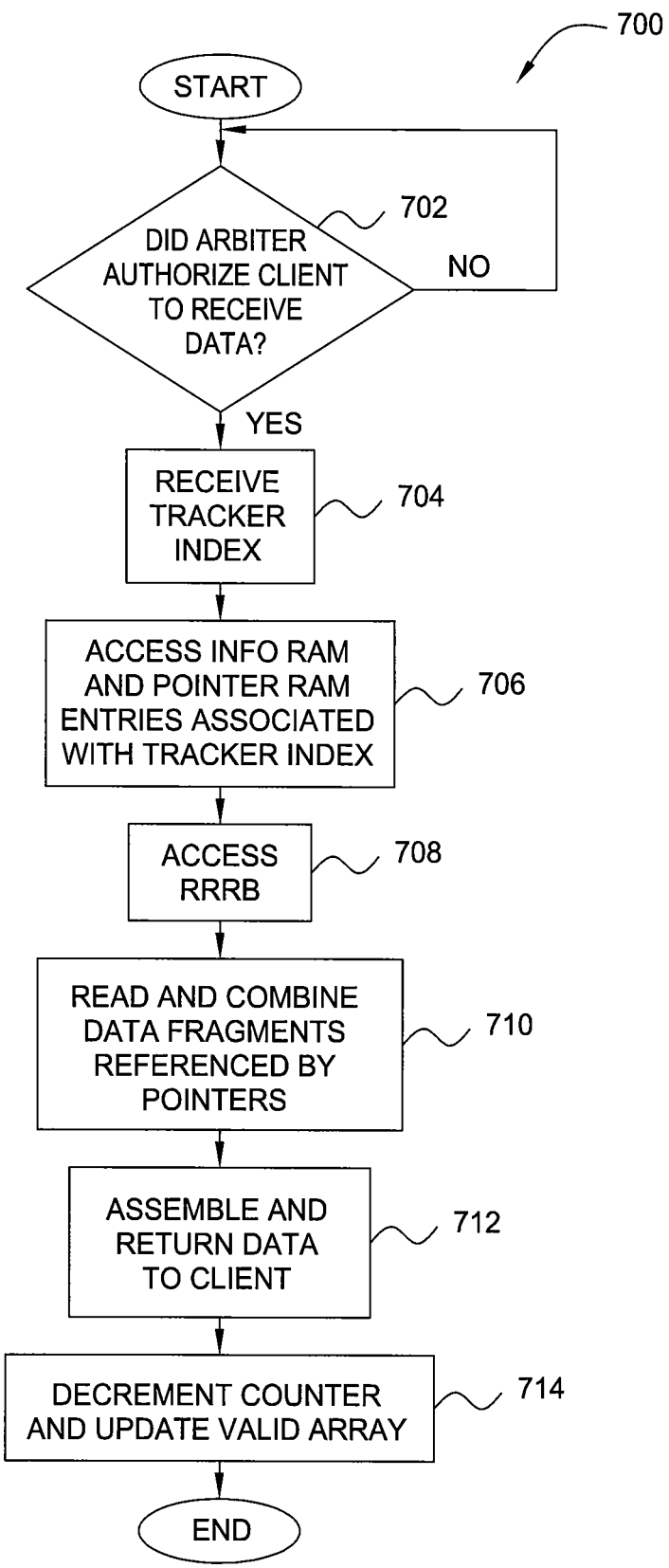
FIG. 7 is a flowchart of method steps for returning requested data to a client, according to one embodiment of the present invention.

FIG. 7 is a flowchart of method steps for returning requested data to a client. Persons skilled in the art will understand that, even though the method 700 is described in conjunction with the system of FIGS. 1 and 2, any system configured to perform the method steps, in any order, is within the scope of the present invention.

The method 700 begins at step 702, where read data packer 330 waits until arbiter 324 allocates read data packer 330 to client 301. At step 704, read data packer 330 receives the tracker index associated with the request from arbiter 324. At step 706, read data packer 330 accesses the row of info RAM 322 and pointer RAM 320 assigned to handle the request. At step 708, read data packer 330 accesses the RRRB(s) 314 storing the data fragments. At step 710, read data packer 330 reads and combines the data fragments referenced by the pointers. At step 712, read data packer 330 assembles the data fragments and returns complete data to client 301. At step 714, counter 312 is decremented to indicate that data has been read from RRRB 314 and the corresponding row of valid array 316 is updated. The method 700 then terminates. In an alternative embodiment, the counter is decremented when the read data packer 330 accesses the RRRB(s) 314.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A method of managing read completions in response to multiple read requests from a client, comprising:
    tracking an order of the multiple read requests in a read request buffer;
    generating first and second subrequests for each of the multiple read requests;
    storing data fragments associated with the multiple read requests at locations within multiple read return buffers;
    storing pointers to the locations within the multiple read return buffers where the data fragments are stored;
    tracking completion of the first and second subrequests for each of the multiple read requests when data fragments associated with the multiple read requests have returned and stored in the multiple read return buffers, to determine whether the multiple read requests have completed;
    examining an in-order first-in-first-out (FIFO) unit to determine whether a first read request of the multiple read requests generated by an in-order client has completed in-order, when the first read requests has completed;
    storing an index for a second read requests of the multiple read requests generated by an out-of-order client, when the second read request has completed; and
    reading out data fragments associated with the multiple read requests from the multiple read return buffers using the stored addresses and based on the tracked order of the multiple read requests.

2. The method according to claim 1, wherein data fragments associated with a read request are read out from the multiple read return buffers if said read request is the next read request for processing and the first and second subrequests for said read request have completed.

3. The method according to claim 2, wherein the read request buffer is a FIFO and the order of the multiple read requests is tracked by storing indices associated with the read requests in the read request buffer in the order they are received.

4. The method according to claim 1, wherein each of the first and second subrequests is associated with one of the multiple read return buffers and a data fragment that is returned in response to a subrequest is stored in the read return buffer associated with said subrequest.

5. The method according to claim 1, wherein the multiple read requests include a first read request and a second read request that is received after the first read request, and the data fragments associated with the first read request are assembled and transmitted to the client before the data fragments associated with the second read request are assembled and transmitted to the client.

6. The method according to claim 5, wherein the read request buffer tracks the order of the first and second read requests by storing indices associated with the first and second read requests as the first and second read requests are received from the client.

7. The method according to claim 1, wherein the pointers are stored in a pointer random access memory (RAM), and wherein both the multiple read return buffers and the pointer RAM reside within an input/output unit.

8. A method of managing read completions in response to read requests from multiple clients, comprising:
    receiving multiple read requests from multiple clients, the multiple clients including at least one in-order client that requires read requests to be completed in the order they were issued;

tracking in a read request buffer an order of multiple read requests that are received from each of the in-order clients;
generating subrequests for each read request;
storing data fragments responsive to the multiple read requests in an addressable memory;
storing addresses of the addressable memory at which the data fragments have been stored in an address memory;
tracking completion of the subrequests for each read request when data fragments associated with the subrequests have returned and stored in the addressable memory, to determine whether the multiple read requests have completed;
examining an in-order first-in-first-out (FIFO) unit to determine whether a first read request of the multiple read requests generated by an in-order client has completed in-order, when the first read requests has completed;
storing an index for a second read requests of the multiple read requests generated by an out-of-order client, when the second read request has completed; and
for read requests from an in-order client, reading out data fragments associated with said read requests from the addressable memory using the addresses stored in the address memory and based on the order of the read requests as tracked for said in-order client.

9. The method according to claim 8, wherein tracking completion of the subrequests for each read request is performed in a scoreboard memory, and wherein the scoreboard memory is updated to indicate completion of a subrequest when a data fragment associated with the subrequest is stored in the addressable memory.

10. The method according to claim 9, wherein the data fragments associated with a read request are not read out from the addressable memory until the scoreboard memory indicates that the subrequests associated with said read request have completed.

11. The method according to claim 8, wherein a subrequest is directed to one of multiple memory interfaces and the data fragment associated with said subrequest is received through said one of multiple memory interfaces.

12. The method according to claim 11, wherein the addressable memory includes multiple buffers, each of which is coupled to one of the memory interfaces.

13. The method according to claim 12, further comprising:
for each buffer, maintaining a count of data fragments stored in the buffer,
wherein the count is increased each time a request for a data fragment is issued to the memory interface coupled to said buffer and decreasing the count each time a data fragment is read out from said buffer.

14. The method according to claim 13, further comprising:
suspending a subrequest directed to a memory interface if the count that is maintained for a buffer that is coupled to the memory interface indicates that said buffer is full.

15. The method according to claim 14, further comprising:
directing the suspended subrequest to the memory interface if the count that is maintained for the buffer that is coupled to the memory interface no longer indicates that said buffer is full.

16. A computer system comprising:
a memory unit divided into a plurality of partitions;
a plurality of clients that generate requests to read data from the memory unit; and
an input/output unit having a read request buffer for tracking an order of read requests received from one of the clients, wherein the input/output unit is configured to return completed read data to said one of the clients in accordance with the tracked order, and wherein the input/output unit is configured to generate a first subrequest and a second subrequest for each read request,
wherein the input/output unit is coupled to the memory unit through a plurality of memory interfaces and includes: multiple read return buffers, each of which is coupled to one of the memory interfaces, for storing data fragments returned through said one of the memory interfaces, a pointer memory that stores addresses of locations within the multiple read return buffers in which the data fragments are stored, a scoreboard memory for tracking completion of the requests to read data, the scoreboard memory indicates when data fragments associated with each read request have returned and stored in the multiple read return buffers to determine whether the requests have completed, an arbiter unit that examines an in-order first-in-first-out (FIFO) unit to determine whether a first read request of the read requests generated by an in-order client has completed in-order, when the first read requests has completed, the arbiter unit also stores an index for a second read requests of the read requests generated by an out-of-order client, when the second read request has completed, and a read data packer that reads out data fragments associated with a read request from the read return buffers using the addresses stored in the pointer memory, assembles the data fragments that have been read out, and returns the assembled data fragments to a requesting client as completed read data.

17. The computer system according to claim 16, wherein the read request buffer is a FIFO for storing indices associated with the requests to read data received from said one of the clients as they are received.

18. The computer system according to claim 17, wherein the input/output unit has an additional read request buffer for tracking an order of read requests received from another one of the clients, wherein the input/output unit is configured to return completed read data to said another one of the clients in accordance with the tracked order.

19. The computer system according to claim 16, further comprising a graphics processing unit, wherein the memory unit is a frame buffer for the graphics processing unit, and the input/output unit is a non-isochronous hub for the graphics processing unit.

* * * * *